United States Patent [19]

Yamanoi et al.

[11] Patent Number: 4,676,556
[45] Date of Patent: Jun. 30, 1987

[54] SEAT BELT ANCHORING DEVICE

[75] Inventors: Toshimi Yamanoi, Atsugi; Osamu Tokugawa, Fujisawa, both of Japan

[73] Assignees: Nissan Motor Co., Ltd., Yokohama; NSK-Warner K.K., Tokyo, both of Japan

[21] Appl. No.: 783,122

[22] Filed: Oct. 2, 1985

[30] Foreign Application Priority Data

Oct. 23, 1984 [JP] Japan .......................... 59-160663[U]

[51] Int. Cl.⁴ ........................................... B60R 22/22
[52] U.S. Cl. .................................. 297/473; 297/216; 297/468
[58] Field of Search ...................... 297/216, 408, 473; 248/393, 429, 430

[56] References Cited

U.S. PATENT DOCUMENTS

| | | | |
|---|---|---|---|
| 3,845,987 | 11/1974 | Bashford | 297/468 |
| 4,248,480 | 2/1981 | Koucky et al. | 297/473 |
| 4,262,963 | 4/1981 | Bauer et al. | 297/473 |

FOREIGN PATENT DOCUMENTS

| | | | |
|---|---|---|---|
| 2400898 | 7/1975 | Fed. Rep. of Germany | 297/468 |
| 2634218 | 2/1978 | Fed. Rep. of Germany | 297/468 |

*Primary Examiner*—Kenneth J. Dorner
*Assistant Examiner*—Peter R. Brown
*Attorney, Agent, or Firm*—Schwartz, Jeffery, Schwaab, Mack, Blumenthal & Evans

[57] ABSTRACT

Herein disclosed is an improved belt anchoring device which is incorporated with a slidable seat. The device uses a monolithic metal bracket for connecting a slide rail of the seat to a pin holder which is slidable on a toothed anchor stay fixed to the vehicle floor together with the seat. Upon application of abnormal impact load thereto through the seat belt, the bracket is forced to bend to permit locking engagement between the pin holder and the anchor stay thereby assuredly and safely dispersing the impact load to the vehicle body through the belt anchoring device.

7 Claims, 6 Drawing Figures

SEAT BELT ANCHORING DEVICE

BACKGROUND OF THE INVENTION

1. Field of the Invention

The present invention relates in general to a safety seat belt arrangement installed in a motor vehicle for protecting a passenger from being thrown out of the seat upon a vehicle collision or the like, and more particularly to a seat belt anchoring device by which impact load applied to the seat belt through a belt wearer (passenger) is assuredly and safely dispersed to the vehicle body.

2. Description of the Prior Art

Hitherto, in a safety seat belt arrangement of a motor vehicle, there have been proposed various seat belt anchoring devices of a type which is incorporated with a position adjustable seat. In the anchoring devices of this type, a slider member to which an end of the seat belt is fixed is movable along an anchor member together with the seat under normal condition, so that the position adjustment of the seat can be achieved without handling a buckle assembly of the seat belt. Upon application of abnormal shock or impact load to the belt, the slider member is brought into locking engagement with the anchor member thereby to permit the load to be dispersed to the vehicle body. However, as will become apparent as the description proceeds, some of the conventional seat belt anchoring devices of such type have suffered from the drawback that due to numerous pivotally connected parts employed therein, unpleasant noises tend to be produced therefrom during moving of the vehicle. This undesirable phenomenon becomes more severe after prolonged use.

SUMMARY OF THE INVENTION

It is therefore an object of the present invention to provide an improved seat belt anchoring device which is free of the above-mentioned drawback.

According to the present invention, there is provided an improved seat belt anchoring device for use with a seat which is slidable on a floor by means of slide rails. The anchoring device comprises an anchor stay pivotally connected to the floor and extending in the direction of seat sliding, the anchor stay being formed with a plurality of longitudinally aligned notches, a pin holder slidably disposed on the anchor stay, the holder having a portion to which an end of the seat belt is fixed, a stopper pin held by the pin holder and brought into locking engagement with one of the notches of the anchor stay when the pin holder is inclined by a given degree relative to the anchor stay, and a bracket mounted on one of the slide rails to move therewith, the bracket being connected to the pin holder and constructed and arranged so that when a certain impact load is applied thereto, it is forced to bend to such a degree as to permit the inclination of the pin holder by the given degree.

BRIEF DESCRIPTION OF THE DRAWINGS

Other objects and advantages of the present invention will become apparent from the following description when taken in conjunction with the accompanying drawings, in which.

DESCRIPTION OF A CONVENTIONAL SEAT BELT ANCHORING DEVICE

Figure 5:
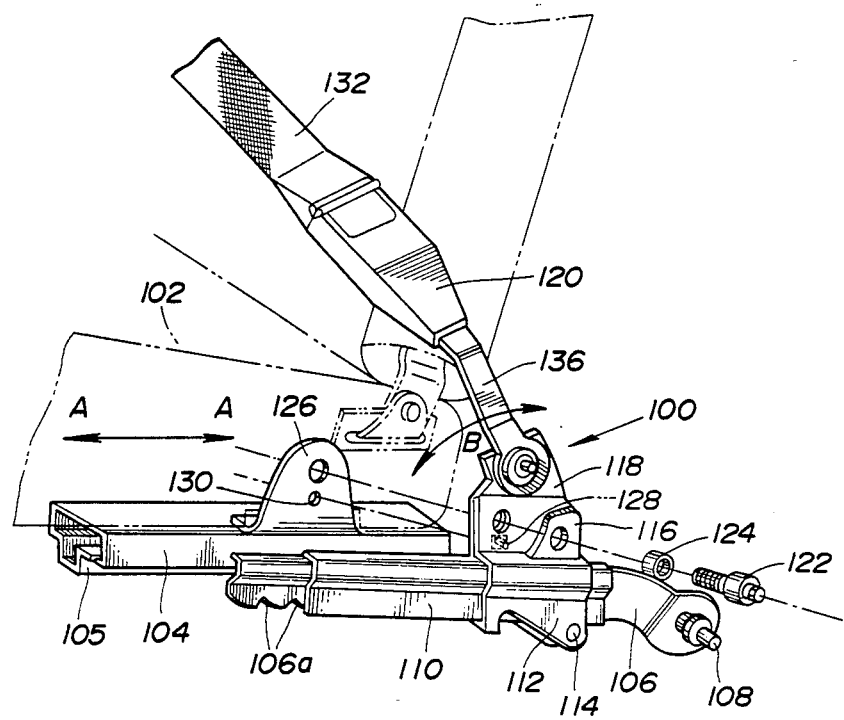
FIG. 5 is a view similar to FIG. 2, but showing one conventional seat belt anchoring device.
Figure 6:
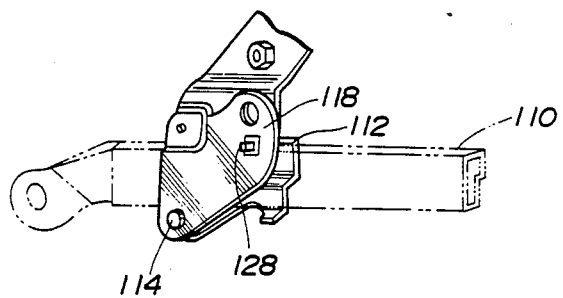
FIG. 6 is a perspective view of an essential part of the conventional seat belt anchoring device, showing a base plate and an anchor stay which are operatively connected.

Prior to describing in detail the invention, one conventional seat belt anchoring device, which is disclosed in Japanese Patent Application First Provisional Publication No. 56-42450, will be outlined with reference to FIGS. 5 and 6 in order to clarify the task of the present invention.

Referring to FIG. 5, there is shown the conventional seat belt anchoring device 100 which is incorporated with a position adjustable seat 102. The seat 102 is mounted on sliding rails 104 (only one is shown) so that the seat 102 is slidable in fore-and-aft direction on a vehicle floor (not shown). A seat belt anchor stay 106 is arranged beside the seat 102 and extends in the direction of the arrow "A—A", that is, in the direction of seat sliding. The right end of the anchor stay 106, as viewed in FIG. 5, is pivotally connected to the vehicle floor through an anchor bolt 108. The anchor stay 106 is formed at its lower edge with a plurality of longitudinally aligned notches 106a. Stationarily disposed on the anchor stay 106 is an elongate cover 110 of flexible plastics along and on which a stopper pin holder 112 slides. The holder 112 is provided with a stopper pin 114 which, upon a vehicle collision, deforms the lower portion of the plastic cover 110 and lockingly engages with one of the notches 106a of the anchor stay 106. The pin holder 112 is formed with a lug 116 at its upper portion. Pivotally connected to the lug 116 is a base plate 118 to which a lower end of a buckle assembly 120 is connected. As is seen from FIG. 6, the base plate 118 holds the other end of the stopper pin 114 which extends from the pin holder 112. For the pivotal connection therebetween, the lug 116 and the base plate 118 are formed with respective openings (no numerals) through which a pivot bolt 122 passes. The pivot bolt 122 passes through also an opening (no numeral) of a bracket 126 which is rigidly mounted on the seat slide rail 104. For achieving smooth pivoting movement, a tubular bearing 124 is coaxially disposed in the mated openings of the lug 116, the base plate 118 and the bracket 126. A nut (not shown) is connected to the bolt 122 so as to assure the connection of these three parts. As is understood from FIG. 6, the base plate 118 is formed with a positioning pin 128 which, upon assembly, is received in a small opening 130 formed in the bracket 126. Under this condition, the stopper pin 114 is kept away from the notches 106a of the anchor stay 106 with an interposal of the lower portion of the cover 110 therebetween. The buckle assembly, as is known, comprises a tongue member fixed to an end of the seat belt 132 and a catcher member 134 pivotally connected to the base plate 118 through an arm member 136.

When, thus, under normal condition, the seat 102 is slided for the position adjustment, the pin holder 112 and thus the base plate 118 move on and along the elongate cover 110 simultaneously in the same direction together with the buckle assembly. Thus, the seat position adjustment can be achieved without handling the buckle assembly.

When an abnormal impact shock is suddenly applied to the seat belt 132 through a belt wearer due to, for example, a vehicle collision, the pin holder 112 is forced to pivot about the pivot bolt 122 in the direction of the arrow "B" breaking the positioning pin 128 and thus disengaging the same from the small opening 130 of the bracket 126. With this pivoting movement, the stopper pin 114 deforms the lower portion of the plastic cover 110 and then comes into locking engagement with one of the notches 106a of the anchor stay 106 thereby achieving a locking connection of the pin holder 112 to the anchor stay 106. Thus, the impact load applied to the seat belt 132 is assuredly transmitted or dispersed to the vehicle floor, that is, to the vehicle body.

However, the above-mentioned seat belt anchoring device 100 has suffered from the drawback that as a clearance is inevitably caused between the positioning pin 128 and the peripheral wall of the small opening 130, vibration of the vehicle tends to induce frequent collision of the pin 128 against the wall thereby producing uncomfortable noises. Furthermore, long use of the device 100 tends to induce a looseness of the pivot bolt 122 causing generation of unpleasant noise trouble therefrom.

DETAILED DESCRIPTION OF THE INVENTION

Figure 1:
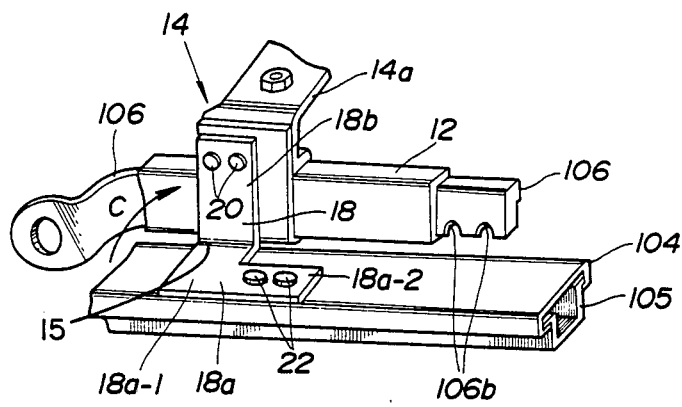
FIG. 1 is a perspective view of an essential part of a seat belt anchoring device of a first embodiment of the present invention.
Figure 2:
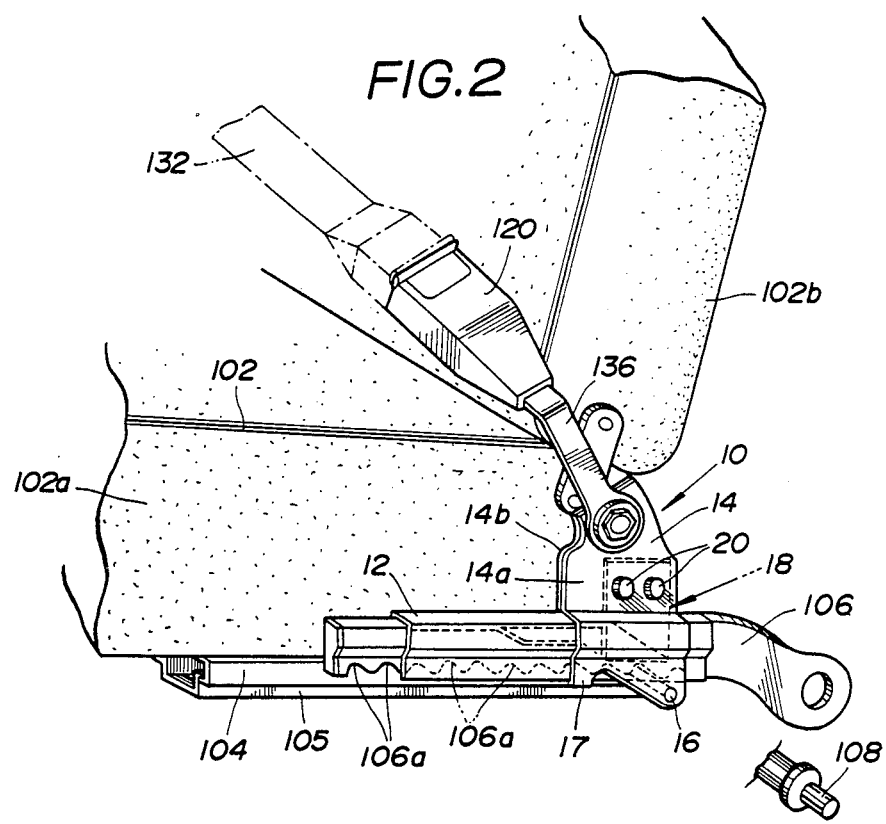
FIG. 2 is a perspective view of the seat belt anchoring device of the first embodiment.

Referring to FIGS. 1 and 2, particularly FIG. 2, there is shown a first embodiment of of the seat belt anchoring device 10 of the present invention, which is shown as incorporated with a position adjustable seat. For ease of the following description, substantially the same parts as those of the above-mentioned conventional device 100 are designated by the same numerals.

The seat 102 shown comprises a seat cushion 102a and a seat back 102b which is pivotally connected to a rear portion of the seat cushion 102a. The seat cushion 102a is mounted on a seat slide mechanism which comprises slide rails 104 (only one is shown) secured to the seat cushion 102a and stationary rails 105 (only one is shown) secured to the vehicle floor (not shown). The slide rails slide on the stationary rails 105 so that the seat 102 can slide in fore-and-aft direction relative to the vehicle floor.

Similar to the above-mentioned prior art, a seat belt anchor stay 106 is arranged beside the seat 102, which extends in the direction of the seat sliding. The right end of the anchor stay 106, as viewed in the drawing, is pivotally connected to the vehicle floor (not shown) through an anchor bolt 108. The anchor stay 106 is an elongate rigid member which is formed at its lower edge with a plurality of notches 106a. Stationarily disposed on the anchor stay 106 is an elongate cover 12 which is constructed of a deformable plastic, such as flexible polyvinyl chloride or the like. Axially slidably disposed on the elongate cover 12 is a stopper pin holder 14 of rigid metal plate. The pin holder 14 comprises an outer plate 14a and an inner plate 14b which are assembled to slidably straddle the cover 12 as is understood from FIG. 2. The holder 14 has at a portion below the cover 12 a stopper pin 16 which extends between the outer and inner plates 14a and 14b. As will be understood as the description proceeds, upon application of abnormal impact load thereto, the pin holder 14 is forced to turn to such a degree that the stopper pin 16 deforms the lower portion of the cover 12 and then comes into locking engagement with one of the notches 106a of the anchor stay 106. The pin holder 14 is formed with a guide portion 17 which slidably holds the lower portions of the elongate cover 12 so as to assure sliding of the pin holder 14 relative to the cover 12.

As is seen from FIG. 1, the inner plate 14b of the stopper pin holder 14 is connected to a bracket 18 which is mounted on the slide rail 104. For the connection of these parts, rivets 20 and 22 are employed. If desired, welding may be employed for the connection. The bracket 18 is constructed of a tough metal and comprises a first or horizontal portion 18a riveted to the slide rail 104 and a second or vertical portion 18b riveted to the inner plate 14b of the stopper pin holder 14, which intersect at generally right angles. The apex of the right angle forms a folded ridge 15 which extends in the direction of seat travel. As is best understood from FIG. 1, the horizontal portion 18a includes a wider part 18a-1 from which the vertical portion 18b extends and a narrower part 18a-2 which extends from the wider part 18a-1 in the same direction as that of the anchor stay 106. The rivets 22 are positioned at the narrower part 18a-2, and the rivets 20 are positioned at an upper part of the vertical portion 18b. The upper portion of the pin holder 14 is pivotally connected to an arm member 136 of a buckle assembly which comprises a tongue member to which an end of the seat belt 132 is fixed and a catcher member 120 to which the tongue member is detachably connected, as is known.

When, under normal condition, the seat 102 is slided for the position adjustment, the stopper pin holder 14 moves on and along the elongate cover 12 simultaneously in the same direction together with the buckle assembly. Thus, the seat position adjustment can be achieved without handling the buckle assembly.

When an abnormal impact load is suddenly applied to the seat belt 132 through a belt wearer due to, for example, a vehicle collision, the bracket 18 is forced to bend at the narrower part 18a-2 thereof in the direction of the arrow C (see FIG. 1) causing the stopper pin holder 14 to turn in the same direction. Due to this turning, the stopper pin 16 is forced to deform a lower portion of the flexible plastic elongate cover 12 and comes into locking engagement with one of the notches 106a of the anchor stay 106 thereby achieving a locking connection of the pin holder 14 to the anchor stay 106. Thus, the impact load applied to the seat belt 132 is assuredly transmitted or dispersed to the vehicle floor, that is, to the vehicle body.

Due to absence of the parts, such as the positioning pin 128, pivot bolt 122 and their associated parts in the conventional device of FIGS. 5 and 6, which would cause generation of unpleasant noises, the seat belt anchoring device 10 of the invention is free of noise trouble. In fact, usage of the monolithic bracket 18 in a manner as mentioned hereinabove provides the anchoring device 10 with a stable positioning under normal condition and an assured locking between the pin holder 14 and the anchor stay 106 upon a vehicle collision.

Figure 3:
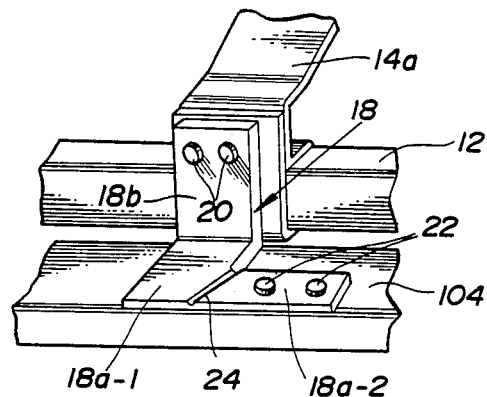
FIG. 3 is a perspective view of an essential part of a seat belt anchoring device of a second embodiment of the present invention.

Referring to FIG. 3, there is shown a second embodiment of the present invention, which is a slight modification of the first embodiment. That is, in the second embodiment, a groove 24 is provided in the horizontal portion 18a of the bracket 18 by cutting the upper side of the portion 18a. Preferably, the groove 24 extends diagonally across the narrower part 18a-2 of the horizontal portion 18a. By the provision of the groove 24, the deformability of the bracket 18 against the external force is increased. In fact, upon shock application, the bracket 18 is bent along the groove 24.

Figure 4:
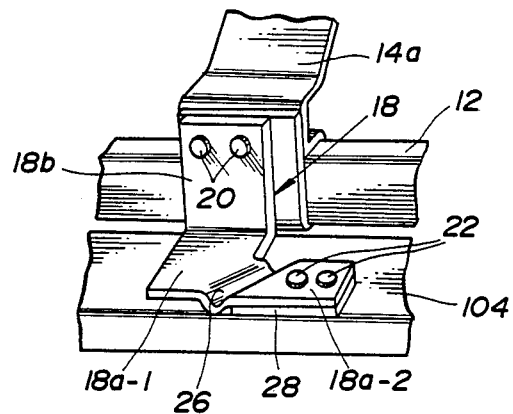
FIG. 4 is a view similar to FIG. 3, but showing a third embodiment of the present invention.

Referring to FIG. 4, there is shown a third embodiment of the present invention, which is also a slight modification of the first embodiment. In this third embodiment, a groove 26 is provided by pressing the horizontal portion 18a of the bracket 18. A spacer 28 is interposed between the narrower part 18a-2 of the horizontal portion 18a and the slide rail 104 in order to form a considerable clearance between the wider part 18a-1 of the horizontal portion 18a and the slide rail 104. With this construction, the bracket 18 is forced to bend along the groove 26 upon application of abnormal impact load thereto.

As is understood from the foregoing description, in the present invention, there is employed the monolithic bracket 18 as a means for not only connecting the pin holder 14 to the slide rail 104, but also permitting inclination of the pin holder 14 relative to the anchor stay upon application of abnormal impact load thereto. Thus, noise problems which would occur in the aforementioned conventional belt anchoring device are not induced or at least minimized in the present invention. Furthermore, since the belt anchoring device of the invention is constructed with a lesser number of parts, assembly is facilitated and thus low cost production is achieved.

What is claimed is:

1. A seat belt anchoring device for use with a seat which is slidable on a floor by means of slide rails, comprising:

a slide rail on which the seat is mounted and a stationary rail on which said slide rail is slidably disposed, said seat thereby being slidable relative to the floor;

an anchor stay pivotally connected to said floor and extending in the direction of seat sliding, said anchor stay being formed with a plurality of longitudinally aligned notches;

a pin holder slidably disposed on said anchor stay, said holder having a portion to which an end of the seat belt is fixed;

a stopper pin held by said pin holder, said stopper pin being brought into locking engagement with one of said notches of the anchor stay when said pin holder is inclined by a given degree relative to said anchor stay; and a bracket mounted on said slide rail to move therewith, said bracket being connected to said pin holder and including means for bending when a certain impact load is applied thereto, said bending means being said bracket to such a degree as to permit the inclination of said pin holder by said given degree;

wherein said bracket includes first and second portions which intersect at a generally right angle and are respectively secured to the slide rail and the pin holder, the apex of said right angle forming a folded ridge extending parallel to said direction of seat sliding, said bending being at a portion of said bracket other than said folded ridge wherein said first portion includes a wider part and a narrower part, said narrower part extending in the same direction as that of the anchor stay, and wherein said bracket is formed with a groove which extends diagonally across said narrower part in order to increase the deformability of the first portion of the bracket.

2. A seat belt anchoring device as claimed in claim 1, in which said groove is provided by cutting the upper side of said first portion of the bracket.

3. A seat belt anchoring device as claimed in claim 1, in which said groove is provided by pressing said first portion of the bracket.

4. A seat belt anchoring device as claimed in claim 3, further comprising a spacer which is interposed between said narrower part of the first portion and the slide rail in order to define a clearance between the wider part of the first portion and the slide rail.

5. A seat belt anchoring device for use with a seat which is slidable on a floor by means of a slide rail, comprising:

an anchor stay pivotally connected to said floor and extending in the direction of seat sliding, said anchor stay being formed with a plurality of longitudinally aligned notches;

a pin holder slidably disposed on said anchor stay, said holder having a portion to which an end of the seat belt is fixed;

a stopper pin held by said pin holder, said stopper pin being brought into locking engagement with one of said notches of the anchor stay when said pin holder is inclined by a given degree relative to said anchor stay; and a bracket having a first end secured to said pin holder and a second end secured to an upper surface of said slide rail, said bracket including means for bending along a line parallel to said surface of said slide rail upon application of a force above a predetermined level being applied to said seat belt end, said bending resulting in the inclination of said pin holder by said given degree, wherein said bending means bending includes a flat portion of said bracket adjacent said second end, said flat portion being parallel to said surface of said slide rail and including a groove means for increasing the bendability of said bracket, and wherein said groove means comprises a cut in said flat portion.

6. A seat belt anchoring device as claimed in claim 5, wherein said cut extends across a width of said flat portion in a direction diagonal with respect to said direction of seat sliding.

7. A seat belt anchoring device for use with a seat which is slidable on a floor by means of a slide rail, comprising:

an anchor stay pivotally connected to said floor and extending in the direction of seat sliding, said anchor stay being formed with a plurality of longitudinally aligned notches;

a pin holder slidably disposed on said anchor stay, said holder having a portion to which an end of the seat belt is fixed;

a stopper pin held by said pin holder, said stopper pin being brought into locking engagement with one of said notches of the anchor stay when said pin holder is inclined by a given degree relative to said anchor stay; and a bracket having a first end secured to said pin holder and a second end secured to an upper surface of said slide rail, said bracket including means for bending along a line parallel to said surface of said slide rail upon application of a force above a predetermined level being applied to said seat belt end, said bending resulting in the inclination of said pin holder by said given degree wherein said bending means includes a flat portion of said bracket adjacent said second end, said flat portion being parallel to said surface of said slide rail and including a groove means for increasing the bendability of said bracket, wherein said groove means comprises a depression formed in said flat area and said depression extends across a width of said flat portion in a direction diagonal with respect to said direction of seat sliding.

* * * * *